(12) United States Patent
Zhao et al.

(10) Patent No.: US 11,938,762 B2
(45) Date of Patent: Mar. 26, 2024

(54) TIRE SENSOR ATTACHMENT STRUCTURE

(71) Applicant: The Goodyear Tire & Rubber Company, Akron, OH (US)

(72) Inventors: Junling Zhao, Hudson, OH (US); Peter Jung-min Suh, Stow, OH (US); Jeffrey McKay West, Uniontown, OH (US); Arun Kumar Byatarayanapura Gopala, Copley, OH (US); Michael William Kestner, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 262 days.

(21) Appl. No.: 17/335,576

(22) Filed: Jun. 1, 2021

(65) Prior Publication Data
US 2022/0055425 A1 Feb. 24, 2022

Related U.S. Application Data

(60) Provisional application No. 63/067,354, filed on Aug. 19, 2020.

(51) Int. Cl.
*B60C 23/04* (2006.01)
*G01M 17/02* (2006.01)

(52) U.S. Cl.
CPC ......... *B60C 23/0493* (2013.01); *G01M 17/02* (2013.01)

(58) Field of Classification Search
CPC .......... B60C 2019/004; B60C 23/0491; B60C 23/0493
See application file for complete search history.

(56) References Cited

U.S. PATENT DOCUMENTS

| | | | |
|---|---|---|---|
| 5,971,046 A | 10/1999 | Koch et al. | |
| 6,309,494 B1 | 10/2001 | Koch et al. | |
| 6,388,567 B1 | 5/2002 | Bohm et al. | |
| 6,443,198 B1 | 9/2002 | Koch et al. | |
| 6,444,069 B1 | 9/2002 | Koch et al. | |
| 6,462,650 B1 | 10/2002 | Balzer et al. | |
| 6,854,324 B2 | 2/2005 | Landes et al. | |
| 6,860,303 B2 | 3/2005 | Rensel et al. | |
| 7,562,568 B2 | 7/2009 | Huang et al. | |
| 7,598,877 B2 | 10/2009 | Lionetti | |

(Continued)

FOREIGN PATENT DOCUMENTS

| | | | |
|---|---|---|---|
| JP | 2007099052 | * | 4/2007 |
| JP | 2009298327 A | | 12/2009 |
| JP | 5261305 B2 | | 5/2013 |
| JP | 2014118078 A | | 6/2014 |

OTHER PUBLICATIONS

Machine translation of JP 2007099052, 2007.*

(Continued)

*Primary Examiner* — Justin R Fischer
(74) *Attorney, Agent, or Firm* — Edward T. Kennedy (57) ABSTRACT

A tire sensor attachment structure is provided. The tire includes a pair of bead areas, a sidewall extending from each respective bead area to a tread, a carcass extending toroidally between each of the bead areas, and an innerliner that is disposed radially inwardly of the carcass. A sensor housing is attached to the innerliner, and defines an interior chamber. A sensor is disposed in the chamber. The tire sensor attachment structure includes a compressible body that is disposed in the chamber between the sensor and the innerliner.

20 Claims, 6 Drawing Sheets

(56) References Cited

U.S. PATENT DOCUMENTS

| | | |
|---|---|---|
| 8,051,705 B2 | 11/2011 | Kobayakawa |
| 8,237,553 B2 | 8/2012 | Wilson et al. |
| 8,511,156 B2 | 8/2013 | Kutzscher |
| 8,596,117 B2 | 12/2013 | Wilson et al. |
| 8,797,762 B2 | 8/2014 | Yamaguchi |
| 8,984,936 B2 | 3/2015 | Brusarosco et al. |
| 9,056,435 B2 | 6/2015 | Hinque et al. |
| 9,146,170 B2 | 9/2015 | Wen et al. |
| 9,834,044 B2 | 12/2017 | Luce |
| 9,908,374 B2 | 3/2018 | Dussinger et al. |
| 10,434,828 B2 | 10/2019 | Wilson et al. |
| 10,639,948 B2 | 5/2020 | Agarwal et al. |
| 10,688,837 B2 | 6/2020 | Mori et al. |
| 2006/0237109 A1 | 10/2006 | Mangold et al. |
| 2007/0018804 A1* | 1/2007 | Strache ............... B60C 23/0493 340/442 |
| 2010/0148950 A1 | 6/2010 | Yamaguchi et al. |
| 2012/0085160 A1 | 4/2012 | Dussinger et al. |
| 2012/0160409 A1 | 6/2012 | Townsend et al. |
| 2014/0103186 A1 | 4/2014 | Nagaya |
| 2021/0370727 A1 | 12/2021 | Yamaguchi |

OTHER PUBLICATIONS https://www.merriam-webster.com/dictionary/surround?src=search-dict-hed, no date.*
Search report for corresponding European patent application received by applicant dated Jan. 5, 2022.

* cited by examiner

TIRE SENSOR ATTACHMENT STRUCTURE

FIELD OF THE INVENTION

The invention relates to tires. More particularly, the invention relates to electronic components that sense various conditions within tires. Specifically, the invention is directed to a structure that enables optimum disposition of an electronic sensor in a housing that is attached to an innerliner of a tire.

BACKGROUND OF THE INVENTION

In the manufacture of a tire, the tire is typically built on the drum of a tire-building machine, which is known in the art as a tire building drum. Numerous tire components are wrapped about and/or applied to the drum in sequence, forming a cylindrical-shaped tire carcass. The tire carcass is then expanded into a toroidal shape for receipt of the remaining components of the tire, such as a belt package and a rubber tread. The completed toroidally-shaped unvulcanized tire carcass, which is known in the art at that stage as a green tire, is then inserted into a mold or press for forming of the tread pattern and curing or vulcanization.

For many modern tires, it is often desirable to mount electronic sensor units to the tires either before or after curing. Such sensor units enable the temperature, pressure and/or other parameters of the tire to be monitored during vehicle operation. All modern electronic sensor units include an integrated circuit that processes and stores information, and one or more sensors are integrated with or electronically connected to the integrated circuit. An antenna for receiving and transmitting a signal to an external reader is also electronically connected to the integrated circuit, and may be carried on a substrate with the integrated circuit. For the purpose of convenience, electronic sensor units with such a construction will be referred to herein as sensors.

Such sensors typically are encapsulated in a rigid or semi-rigid polymer casing to protect the integrity of the integrated circuit, sensor and/or antenna, and commonly are about 5 to 10 millimeters (mm) thick by about 15 to 25 mm in diameter. Due to the size of the sensor, the nature of the construction of the components of the sensor, and the nature of the construction of the tire, the sensors have typically been attached to the inside surface of a pneumatic tire, which is referred to as the innerliner. Such a location has enabled the sensors to continuously sense parameters such as the temperature and pressure inside the tire cavity, while not interfering with the structure of the tire.

However, direct mounting the rigid or semi-rigid casing of the sensor to the tire innerliner has traditionally been complex and/or expensive due to the different materials used for the sensor casing and the tire innerliner, as well as the harsh environment inside the tire. For example, the sensors must remain adhered to the tire innerliner for a long period of time under conditions that include high and low temperatures, high rotational speeds, continuous deflection of the tire, and the like.

Because such direct attachment of the sensor casing to the tire innerliner is difficult, discrete housings have been developed. Such housings are often formed of a material that may be readily adhered to the tire innerliner, and include an interior chamber that receives the sensor. However, in such structures, the sensor is often able to move inside the housing during vehicle operation, which causes the sensor to impact against the housing. Repeated impacts of the rigid sensor casing against the housing in turn cause cracking of the housing, thereby reducing the life of the housing. Such impacts may also reduce the life of the sensor or impede its operation. The impacts also create vibration inside the tire, which is undesirable.

As a result, it is desirable to develop a structure for a tire that enables optimum disposition of a sensor in a housing with secure attachment of the sensor to an innerliner of the tire.

SUMMARY OF THE INVENTION

According to an aspect of an exemplary embodiment of the invention, a tire sensor attachment structure is provided. The tire includes a pair of bead areas, a sidewall extending from each respective bead area to a tread, a carcass extending toroidally between each of the bead areas, and an innerliner that is disposed radially inwardly of the carcass. A sensor housing is attached to the innerliner and defines an interior chamber. A sensor is disposed in the chamber. The tire sensor attachment structure includes a compressible body that is disposed in the chamber between the sensor and the innerliner.

Definitions

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"CAN" is an abbreviation for controlled area network, as used in reference to the CAN bus system of a vehicle.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"TPMS" is an abbreviation for tire pressure monitoring system.

BRIEF DESCRIPTION OF DRAWINGS

The invention will be described by way of example and with reference to the accompanying drawings, in which.

Similar numerals refer to similar parts throughout the drawings.

DETAILED DESCRIPTION OF THE INVENTION

Figure 1:
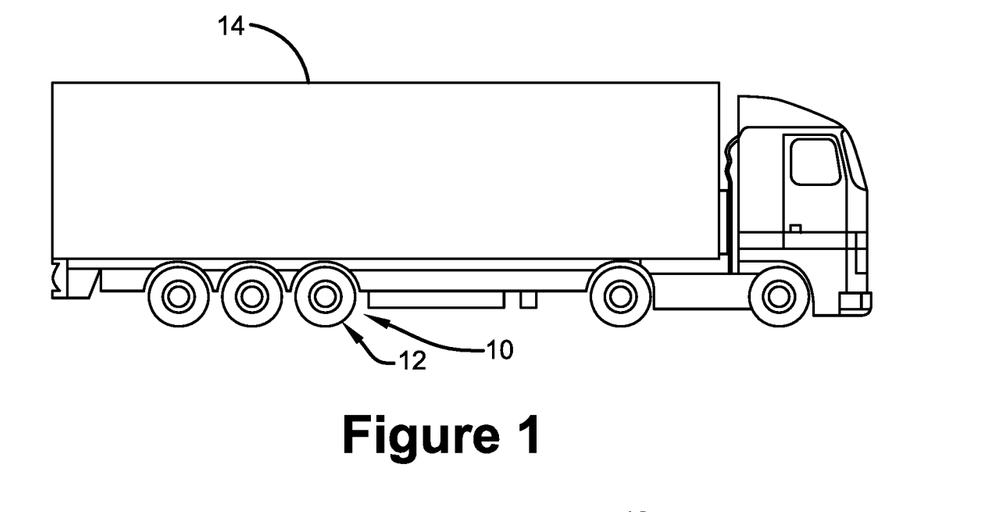
FIG. 1 is a schematic side view of a vehicle with tires.

Turning now to FIGS. 1 through 11, an exemplary embodiment of a tire sensor attachment structure of the present invention is indicated at 10. By way of background, as shown in FIG. 1, the tire sensor attachment structure 10 is employed in a tire 12 supporting a vehicle 14. While the vehicle 14 is depicted as a commercial truck, the invention is not to be so restricted. The principles of the invention find application in other vehicle categories such as passenger cars, other commercial vehicles, off-the-road vehicles, and the like, in which vehicles may be supported by more or fewer tires. In addition, the invention finds application in a single vehicle 14 or in fleets of vehicles.

Figure 2:
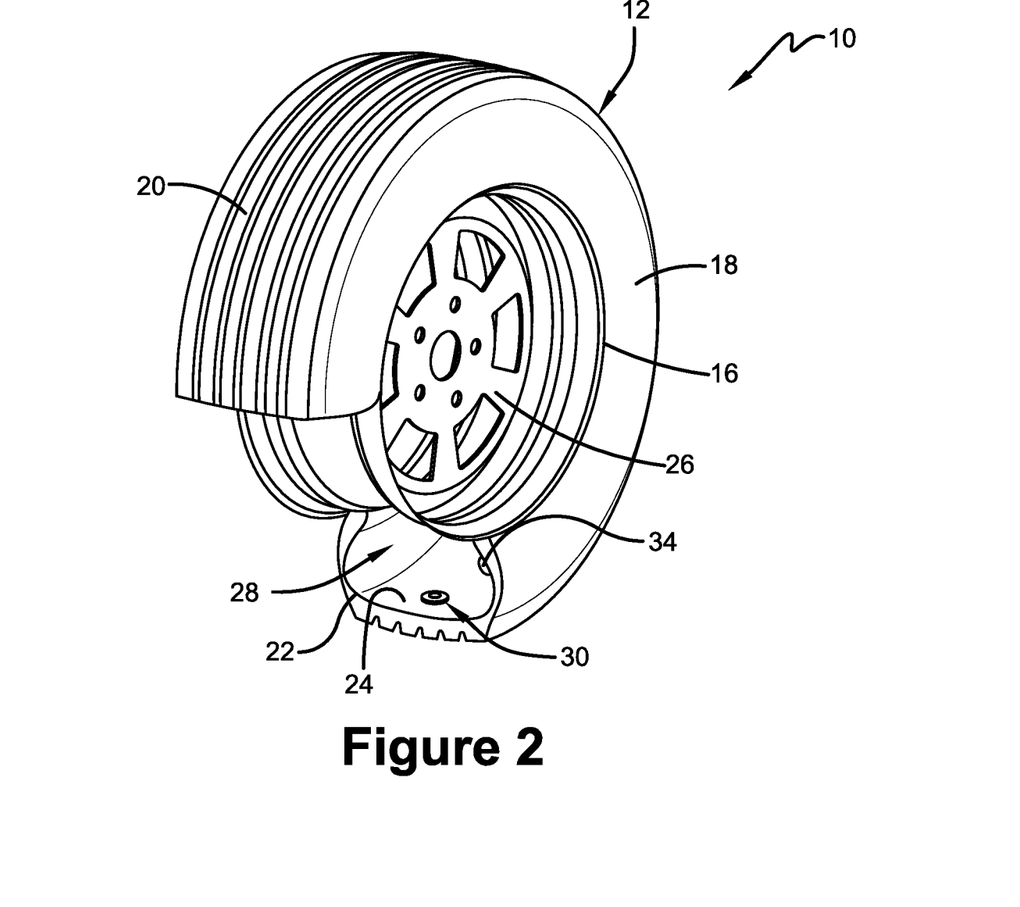
FIG. 2 is a schematic perspective of a tire shown in FIG. 1, partially in section, with an exemplary embodiment of a sensor.

Turning to FIG. 2, each tire 12 includes a pair of bead areas 16 (only one shown) and a bead core (not shown) embedded in each bead area. Each one of a pair of sidewalls 18 (only one shown) extends radially outward from a respective bead area 16 to a ground-contacting tread 20. The tire 12 is reinforced by a carcass 22 that toroidally extends from one bead area 16 to the other bead area, as known to those skilled in the art. An innerliner 24 is formed on the inside surface of the carcass 22. The tire 12 is mounted on a wheel 26 in a manner known to those skilled in the art and, when mounted, forms an internal cavity 28 that is filled with a pressurized fluid, such as air.

A sensor unit 30 is mounted on each tire 12 and includes one or more sensors for detecting certain real-time tire parameters inside the tire, such as tire pressure and temperature. Preferably the sensor unit 30 is a tire pressure monitoring system (TPMS) module or sensor, of a type that is commercially available, and may be of any known configuration. Each TPMS sensor 30 preferably also includes electronic memory capacity for storing identification (ID) information for each tire 12, known as tire ID information. Alternatively, tire ID information may be included in another sensor unit, or in a separate tire ID storage medium, such as a tire ID tag 34.

The TMPS sensor 30 and the tire ID tag 34 each include an antenna for wireless transmission of the measured tire pressure and temperature data, as well as tire ID data, to a processor that is in communication with the controlled area network (CAN) bus system of the vehicle 14 and/or a telematics unit, which enables processing and/or further transmission of the data. The TPMS sensor 30 is encapsulated in a rigid or semi-rigid polymer casing 36 (FIG. 3) to protect the integrity of the pressure sensor, temperature sensor, integrated circuit and/or antenna.

The TPMS sensor 30 is attached to the innerliner 24 of each tire 12. In the prior art, the casing 36 has been directly attached to the innerliner 24 by an adhesive. Due to the above-described disadvantages of directly mounting the sensor casing 36 to the innerliner 24, discrete housings 38 were developed.

Figure 3:
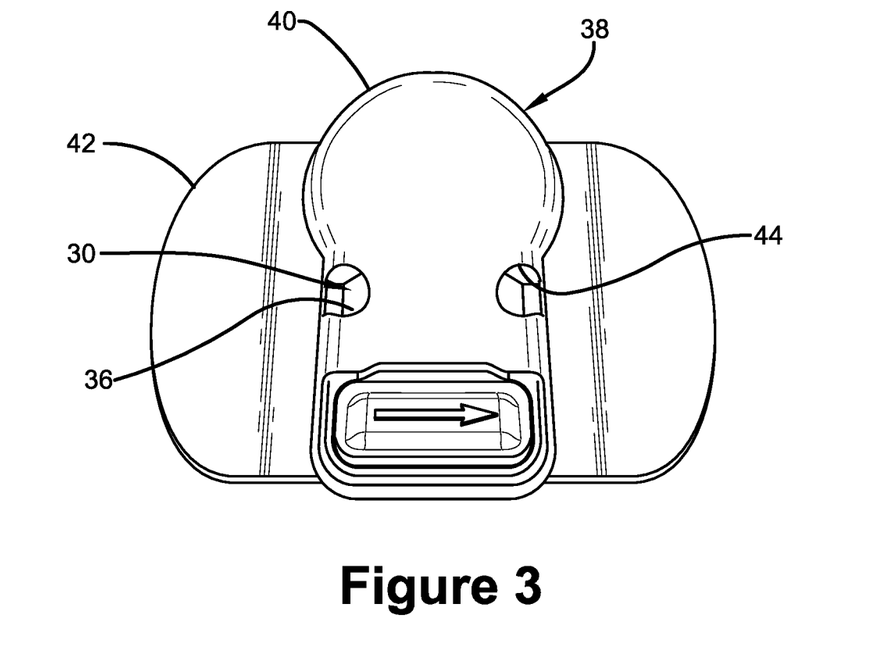
FIG. 3 is a top view of an exemplary housing and sensor.
Figure 4:
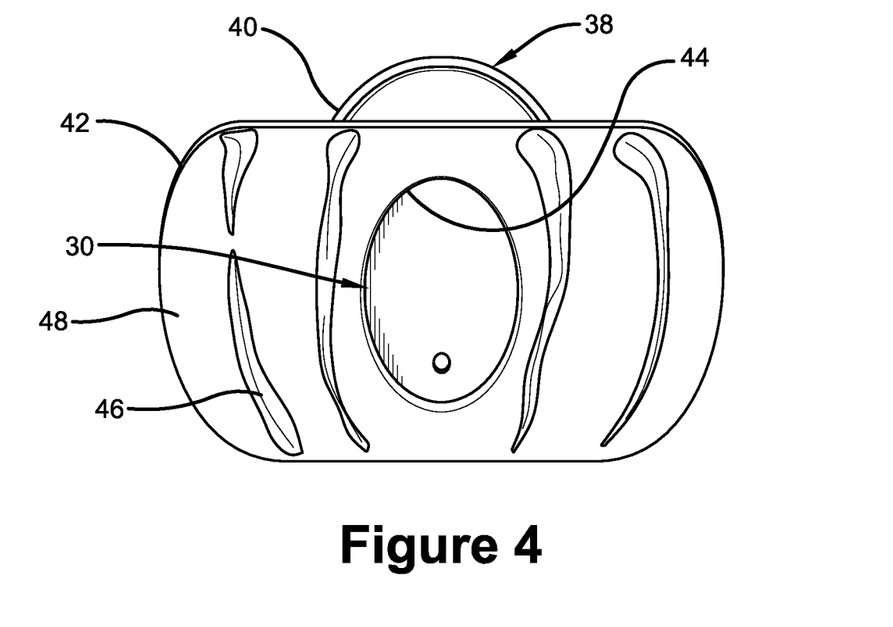
FIG. 4 is a bottom view of the sensor and housing shown in FIG. 3, with adhesive applied to the housing.

Turning to FIGS. 3 and 4, an exemplary housing 38 includes an upper member 40 and a lower member 42, which cooperate to define an interior chamber 44. The TPMS sensor 30 is disposed in the chamber 44. The upper member 40 mechanically interlocks with the lower member 42, or is securely attached to the lower member with an adhesive. The lower member 42 typically is formed of an elastomer or an elastomeric material to enable the housing 38 to be readily adhered to the innerliner. The lower member 42 includes a bottom surface 48 that receives an adhesive 46 to facilitate attachment of the housing to the innerliner 24.

As described above, in the prior art, the TPMS sensor 30 is often able to move inside the housing 38 during vehicle operation, which may cause undesirably cracking of the housing, reduction of the life or operation of the sensor, and/or vibration in the tire 12.

With reference to FIGS. 5 through 9C, the tire sensor attachment structure of the present invention 10 reduces such issues by enabling optimum disposition of the TPMS sensor 30 in the housing 38. The tire sensor attachment structure 10 includes a discrete body 50 formed with an outer perimeter 52. The perimeter 52 corresponds to the shape of the housing chamber 44 in the axial and circumferential directions, and the size of the chamber in the axial and circumferential directions. The perimeter 52 thus enables the body 50 to be of the same shape and size of the housing chamber 44 in the axial and circumferential directions. In this manner, the tire sensor attachment structure 10 is disposed securely in the housing chamber 44. For example, when the chamber 44 is oval-shaped, the perimeter 52 of the attachment structure 10 is formed in an oval shape, thus providing the body 50 with a corresponding oval shape.

Figure 5:
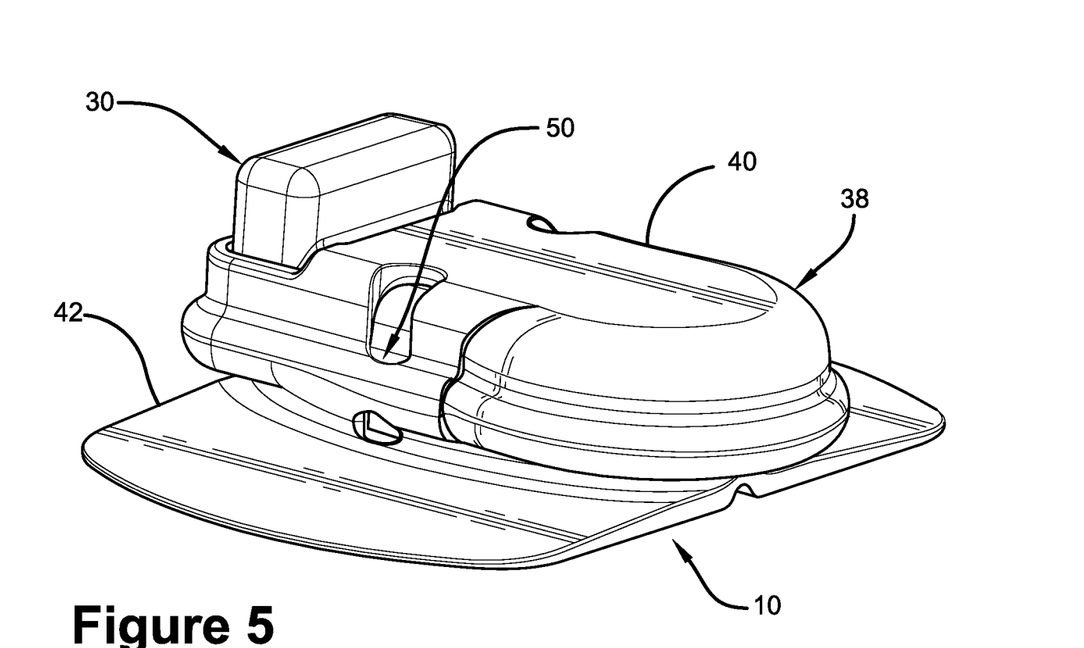
FIG. 5 is a top perspective view of a housing, sensor and sensor attachment structure of the present invention.
Figure 8:
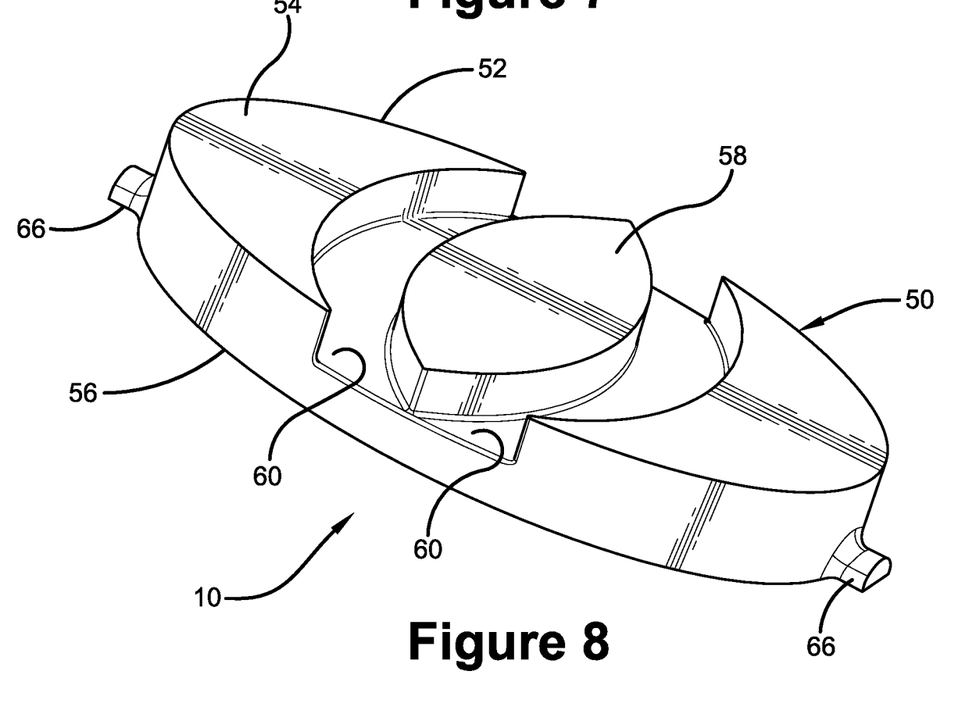
FIG. 8 is a perspective view of the sensor attachment structure of the present invention.

The body 50 also includes an upper surface 54 and a lower surface 56. A center area 58 is formed in the upper surface 54, and is defined by at least one channel 60 that extends across the body 50, and preferably two channels. Preferably, the center area 58 is defined by two arcuately-shaped channels 60 that extend across the body 50.

The body 50 is preferably formed of a structural material that is compressible in a radial direction, which is the same direction of a thickness 62 of the body. The form of the material of the body 50 may be a solid piece, closed-cell foam, or opened-cell foam. In addition, the material type of the body 50 may be an unfilled or filled rubber, including nitrile rubber (NR and NBR), isoprene rubber (IR), styrene-butadiene rubber (SBR), butadiene rubber (BR), butyl rubber (IIR, CIIR and BIIR), brominated poly(isobutylene-co-p-methylstyrene) specialty elastomers (BIMS), ethylene propylene diene monomer (EPDM) rubber, chloroprene rubber (CR), silicon rubber, hydrogenated acrylonitrile butadiene rubber (HNBR), and the like, which may be compounded with carbon black, silica, clay, other known fillers, and combinations thereof.

The material type of the body 50 may alternatively be a structural foam tape, including double-sided adhesive foam tape, or a polyurethane, including polyurethane elastomers, flexible foams, and cross-linked foams. Other material types of the body 50 may be thermoplastic elastomers, including polyolefin thermoplastic elastomers, block polymers, polyester thermoplastic elastomers, thermoplastic polyurethane elastomers, and ethylene-vinyl acetate (EVA) copolymers. The body 50 may also be formed of a plastic, including polyethylene, polyester, urethane, acrylic, polypropylene, and the like. For example, a preferred form and material for the body 50 may include a double-sided adhesive foam tape with an acrylic adhesive applied over a foam core.

Figure 9A:
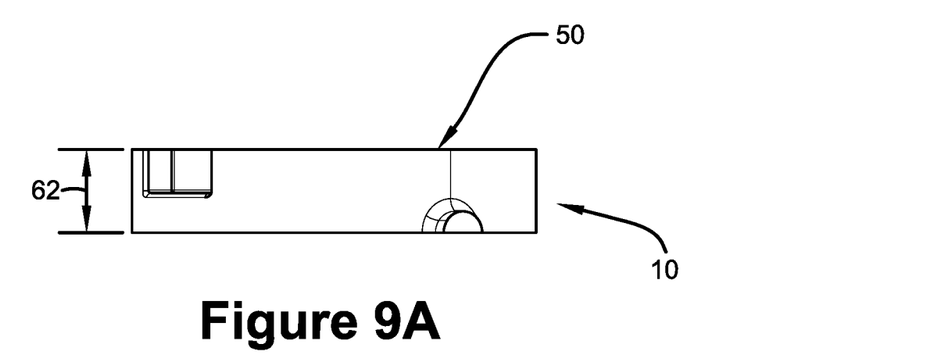
FIG. 9A is an elevational view of the sensor attachment structure shown in FIG. 8, formed at a first thickness.
Figure 9B:
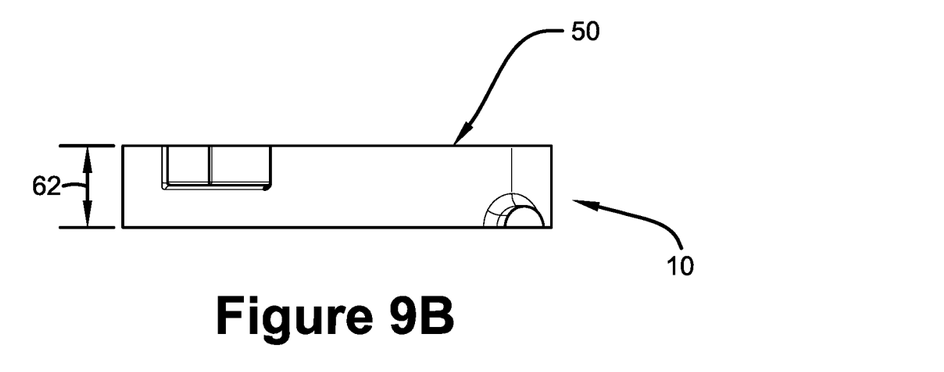
FIG. 9B is an elevational view of the sensor attachment structure shown in FIG. 8, formed at a second thickness.
Figure 9C:
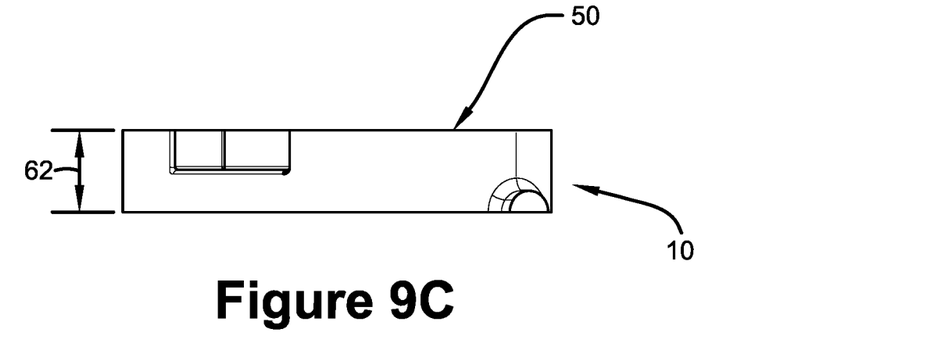
FIG. 9C is an elevational view of the sensor attachment structure shown in FIG. 8, formed at a third thickness.

Because the body 50 is compressible, it is preferably formed with a thickness 62 that is slightly greater than the difference between the radial thickness 70 of the TPMS sensor 30 and the radial height 72 of the chamber 44. For example, when the radial height 72 of the chamber 44 is about 14 millimeters and the radial thickness 70 of the TPMS sensor is about 10 millimeters, yielding a difference of about 4 millimeters, the thickness 62 of the body 50 may be about 6 millimeters. As shown in FIGS. 9A through 9C, the thickness 62 of the body 50 of the attachment structure 10 may be adjusted based on the particular thickness 70 of the TPMS sensor 30 and the radial height 72 of the chamber 44.

Returning to FIGS. 7 and 8, the arcuate shape of the channels 60 enable the center area 58 to expand when the body 50 is in radial compression. The channels 60 thus cooperate with the compressible material of the body 50 to enable a structurally stable, yet compressible base for the TPMS sensor 30. Because the thickness 62 of the body 50 combined with the thickness 70 of the TPMS sensor 30 is greater than the radial height 72 of the housing chamber 44, but the TPMS sensor seats on the radially compressible center area 58 of the body, there is no movement of the sensor within the chamber when the housing 38 is assembled. The sensor attachment structure 10 thus provides a press fit of the TPMS sensor 30 in the housing chamber 44. Moreover, the attachment structure 10 enables such a press fit of the TPMS sensor 30 in the chamber 44 without damage to the integrity of the sensor. The channels 60 also allow air from the tire cavity 28 to reach the TPMS sensor 60, thereby enabling the pressure and temperature sensors in the TPMS sensor 30 to take accurate measurements.

As described above, the TPMS sensor 30 seats on the center area 58 of the body 50 and preferably is secured to the body by compressive force once the upper member 40 of the housing 38 engages the lower member 42 of the housing. Optionally, an adhesive may be applied to the center area 58 of the body 50 to provide adhesive engagement of the TMPS sensor 30 to the upper surface 54 of the body. Exemplary adhesives include pressure-sensitive adhesives, acrylic adhesives, epoxy adhesives, polyurethane (PUR) adhesives, urethane adhesives, silicone adhesives, nitrile adhesives, and cyanoacrylates.

Figure 6:
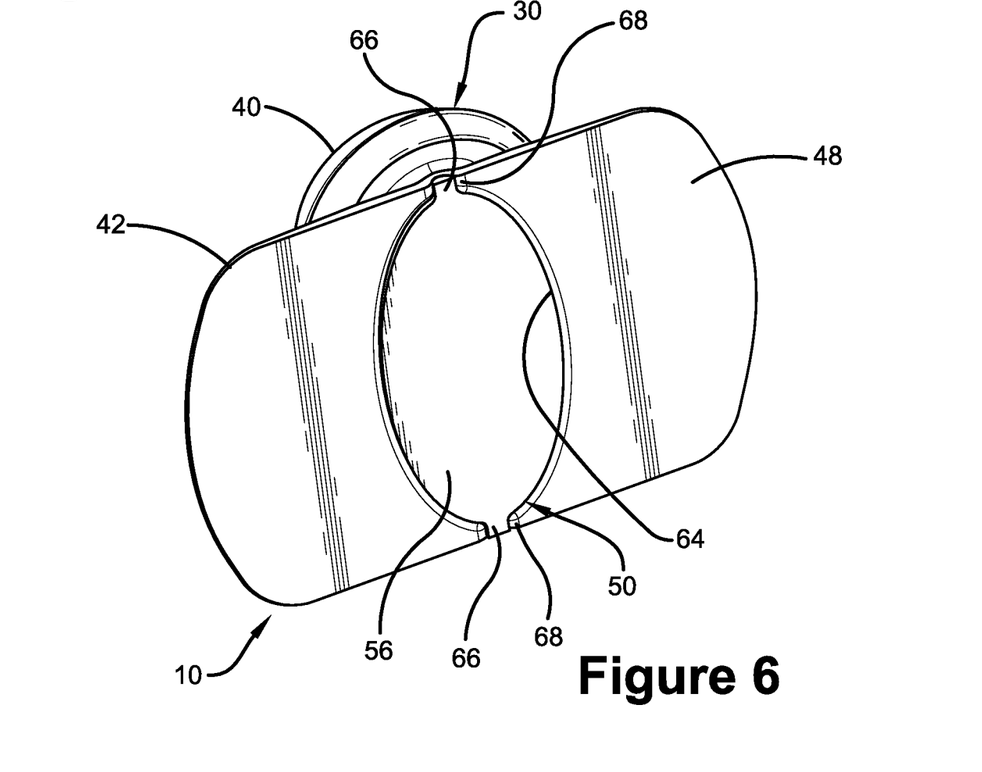
FIG. 6 is a bottom perspective view of the housing, sensor and sensor attachment structure shown in FIG. 5.
Figure 7:
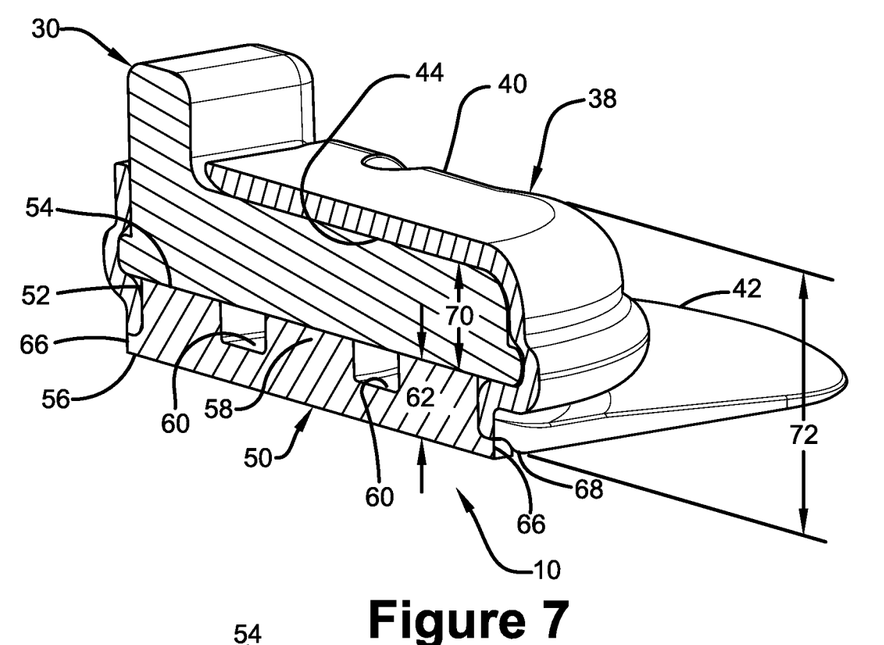
FIG. 7 is a cross-sectional view of the housing, sensor and sensor attachment structure shown in FIG. 5.

Referring to FIG. 6, the lower surface 56 of the body 50 contacts the innerliner 24 of the tire 12 through an opening 64 formed in the lower member 42 of the housing 38. Preferably, an adhesive is applied to the lower surface 56 to secure the body 50 to the innerliner 24. Exemplary adhesives include pressure-sensitive adhesives, acrylic adhesives, epoxy adhesives, polyurethane (PUR) adhesives, urethane adhesives, silicone adhesives, nitrile adhesives, and cyanoacrylates.

The body 50 also optionally includes at least two projections 66, each one of which engages a corresponding dimple 68 in the lower member 42 of the housing 38. The engagement of the projections 66 with the dimples 68 provides further mechanical engagement of the attachment structure body 50 with the housing 38 to reduce movement of the body relative to the housing during operation of the vehicle 14 and the tire 12.

Figure 10:
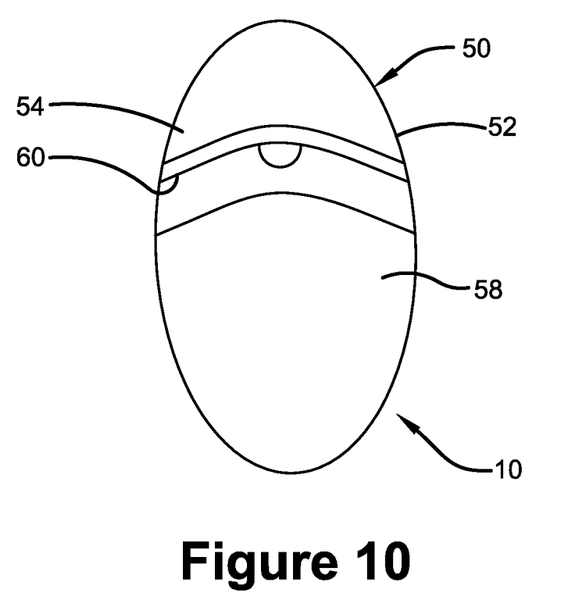
FIG. 10 is a plan view of an alternative body configuration of the sensor attachment structure of the present invention.
Figure 11:
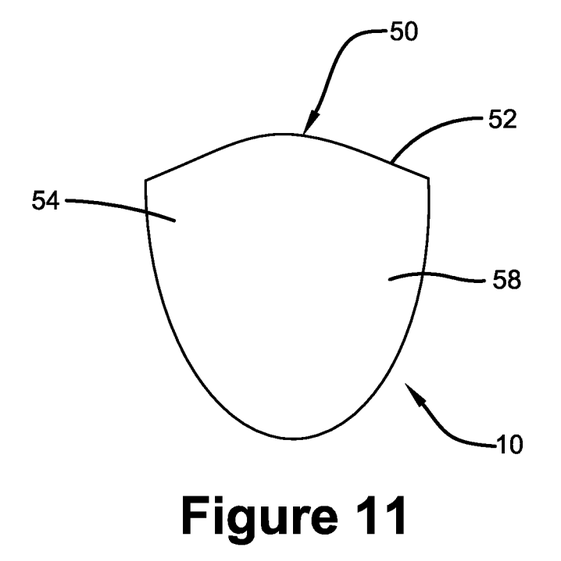
FIG. 11 is a plan view of another alternative body configuration of the sensor attachment structure of the present invention.

As mentioned above, the upper surface 54 of the body 50 may include one channel 60 that extends across the body, which is shown in FIG. 10. As also mentioned above, the body 50 as defined by the perimeter 52 may be of any size and shape suitable for the housing chamber 44. Thus, the body 50 may be of any geometric shape, such as circular, oval, elliptical, rectangular, and the like. An alternative size and shape of the body 50 is shown by way of example in FIG. 11, and does not include channels 60 (FIG. 8) formed in the body.

In this manner, the tire sensor attachment structure 10 of the present invention provides a stable mounting platform to secure the TPMS sensor 30 in the chamber 44 of the housing 38 in a press fit, without damage to the TPMS sensor. The press fit of the TPMS sensor 30 within the housing chamber 44 reduces movement of the sensor within the housing during vehicle operation, which in turn reduces impacts of the sensor against the housing 38. By reducing such impacts, cracking of the housing 38 is reduced, which increases the life of the housing and enables optimum operation of the TPMS sensor 30. In addition, vibration inside the tire 12 caused by such impacts is desirably reduced. The tire sensor attachment structure 10 therefore enables optimum disposition of the TPMS sensor 30 in the housing 38 and secure attachment of the sensor to the innerliner 24 of the tire 12.

The present invention also includes a method of attaching a sensor 30 to a tire 12. The method includes steps in accordance with the description that is presented above and shown in FIGS. 1 through 11.

It is to be understood that the features of the above-described tire sensor attachment structure and accompanying method may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire sensor attachment structure, wherein the tire includes a pair of bead areas, a sidewall extending from each respective bead area to a tread, a carcass extending toroidally between each of the bead areas, and an innerliner being disposed radially inwardly of the carcass, and a housing is attached to the innerliner, wherein the housing defines an interior chamber, and a sensor is disposed in the chamber, the tire sensor attachment structure comprising:

a discrete body, the body being formed of a compressible material and being disposed in the chamber only between the sensor and the innerliner, wherein the body includes an upper surface and a lower surface, and a center area is formed in the upper surface, wherein the center area is defined by two arcuately-shaped channels extending across the body.

2. The tire sensor attachment structure of claim 1, wherein the body is formed with an outer perimeter, the outer perimeter corresponding to a shape of the chamber in an axial direction and a circumferential direction, and corresponding to a size of the chamber in the axial direction and the circumferential direction.

3. The tire sensor attachment structure of claim 1, wherein the body is formed with a thickness that is greater than a difference between a radial thickness of the sensor and a radial height of the chamber.

4. The tire sensor attachment structure of claim 1, wherein the sensor is secured to the body by compressive force inside the housing.

5. The tire sensor attachment structure of claim 1, further comprising an adhesive being applied to the body to provide adhesive engagement of the sensor to the body.

6. The tire sensor attachment structure of claim 1, wherein the compressible material includes at least one of an acrylic foam and a butyl rubber.

7. A tire sensor attachment structure, wherein the tire includes a pair of bead areas, a sidewall extending from each respective bead area to a tread, a carcass extending toroidally between each of the bead areas, and an innerliner being disposed radially inwardly of the carcass, and a housing is attached to the innerliner, wherein the housing defines an interior chamber, and a sensor is disposed in the chamber, the tire sensor attachment structure comprising:
a discrete body, the body being formed of a compressible material and being disposed in the chamber between the sensor and the innerliner, wherein the body includes an upper surface and a lower surface, and the lower surface of the body contacts the innerliner through an opening formed in the housing.

8. The tire sensor attachment structure of claim 7, further comprising an adhesive being applied to the lower surface of the body to secure the body to the innerliner.

9. The tire sensor attachment structure of claim 7, wherein the body is formed with an outer perimeter, the outer perimeter corresponding to a shape of the chamber in an axial direction and a circumferential direction, and corresponding to a size of the chamber in the axial direction and the circumferential direction.

10. The tire sensor attachment structure of claim 7, wherein the body is formed with a thickness that is greater than a difference between a radial thickness of the sensor and a radial height of the chamber.

11. The tire sensor attachment structure of claim 7, wherein the sensor is secured to the body by compressive force inside the housing.

12. The tire sensor attachment structure of claim 7, further comprising an adhesive being applied to the body to provide adhesive engagement of the sensor to the body.

13. The tire sensor attachment structure of claim 7, wherein the compressible material includes at least one of an acrylic foam and a butyl rubber.

14. A tire sensor attachment structure, wherein the tire includes a pair of bead areas, a sidewall extending from each respective bead area to a tread, a carcass extending toroidally between each of the bead areas, and an innerliner being disposed radially inwardly of the carcass, and a housing is attached to the innerliner, wherein the housing defines an interior chamber, and a sensor is disposed in the chamber, the tire sensor attachment structure comprising:
a discrete body, the body being formed of a compressible material and being disposed in the chamber only between the sensor and the innerliner, wherein the body includes at least two projections, each one of the projections engaging a corresponding dimple formed in the housing.

15. The tire sensor attachment structure of claim 14, wherein the body is formed with an outer perimeter, the outer perimeter corresponding to a shape of the chamber in an axial direction and a circumferential direction, and corresponding to a size of the chamber in the axial direction and the circumferential direction.

16. The tire sensor attachment structure of claim 14, wherein the body is formed with a thickness that is greater than a difference between a radial thickness of the sensor and a radial height of the chamber.

17. The tire sensor attachment structure of claim 14, wherein the sensor is secured to the body by compressive force inside the housing.

18. The tire sensor attachment structure of claim 14, further comprising an adhesive being applied to the body to provide adhesive engagement of the sensor to the body.

19. The tire sensor attachment structure of claim 14, wherein the compressible material includes at least one of an acrylic foam and a butyl rubber.

20. A tire sensor attachment structure, wherein the tire includes a pair of bead areas, a sidewall extending from each respective bead area to a tread, a carcass extending toroidally between each of the bead areas, and an innerliner being disposed radially inwardly of the carcass, and a housing is attached to the innerliner, wherein the housing defines an interior chamber, and a sensor is disposed in the chamber, the tire sensor attachment structure comprising:
a discrete body, the body being formed of a compressible material and being disposed in the chamber only between the sensor and the innerliner, wherein the compressible material includes a double-sided adhesive foam tape comprising an acrylic adhesive applied over a foam core.

* * * * *